United States Patent [19]

Ott

[11] Patent Number: 4,561,523

[45] Date of Patent: Dec. 31, 1985

[54] AUTOMATIC SLACK ADJUSTER

[75] Inventor: William E. Ott, Elyria, Ohio

[73] Assignee: Allied Corporation, Morristown, N.J.

[21] Appl. No.: 562,322

[22] Filed: Dec. 16, 1983

[51] Int. Cl.⁴ .................... F16D 51/22; F16D 65/40
[52] U.S. Cl. .................... 188/79.5 K; 188/196 BA
[58] Field of Search .............. 188/79.5 K, 79.5 R,
   188/79.5 P, 79.5 B, 79.5 SC, 362, 196 C, 196 V,
               196 D, 196 R, 196 BA; 192/111 A

[56] References Cited

U.S. PATENT DOCUMENTS

| | | | |
|---|---|---|---|
| 2,203,890 | 6/1940 | Browall et al. | 188/196 C |
| 2,225,001 | 12/1940 | Browall | 188/196 C |
| 3,921,765 | 11/1975 | Swander, Jr. | 188/79.5 K |
| 3,990,546 | 11/1976 | Schultz | 188/79.5 K |
| 3,997,035 | 12/1976 | Zeidler | 188/79.5 K |
| 3,997,036 | 12/1976 | Zeidler | 188/79.5 K |

FOREIGN PATENT DOCUMENTS

| | | |
|---|---|---|
| 2506428 | 8/1975 | Fed. Rep. of Germany . |
| 2632331 | 2/1977 | Fed. Rep. of Germany . |
| 2087012 | 5/1982 | United Kingdom .......... 188/79.5 K |

Primary Examiner—Douglas C. Butler
Assistant Examiner—Robert J. Oberleitner
Attorney, Agent, or Firm—Ken C. Decker; W. N. Antonis

[57] ABSTRACT

Automatic slack adjuster (10) for a vehicle braking system is provided with a bifurcated driving link (64) which drives an adjustment shaft (44) in a direction backing off the brake adjustment during the initial portion of the brake application stroke and effecting adjustment of the brake during the terminal portion of the brake application stroke. The mechanism connecting the link (64) to the shaft (44) includes an adjustment effecting lever (74) which is engaged with one arm (60) of link (64) through a lost motion connection. A back-off lever (80) is connected to the arm (62) of link (64) with little or no lost motion so that the back-off lever (80) is actuated during the initial portion of the brake actuating stroke before the lost motion between the adjustment effecting lever (74) and arm (60) is taken up. Levers (74,80) are connected to the adjustment shaft (44) by corresponding coiled clutch springs (86,92).

18 Claims, 4 Drawing Figures

AUTOMATIC SLACK ADJUSTER

This invention relates to an automatic slack adjuster for a vehicle braking system.

Automatic slack adjusters have been used on heavy duty vehicle braking systems for many years. The primary use of automatic slack adjusters is to actuate S-cam drum brakes; however, more recently, automatic slack adjusters have also been used to actuate heavy duty disc brakes. Automatic slack adjusters of this type function both to convert linear motion into rotary motion so that a brake application may be effected, and to maintain a substantially constant shoe-to-drum lining clearance. A typical prior art automatic slack adjuster is disclosed in U.S. Pat. No. 3,901,357. Prior art automatic slack adjusters include a lever housing which is mounted on a drive shaft which is connected to the vehicle brake, and also include an adjustment shaft that indexes the drive shaft relative to housing to compensate for lining wear.

Although the prior art automatic slack adjusters adjust to compensate for lining wear, the clearance between the brake shoe and the drum is due to both lining wear and the drum diameter. Prior art automatic slack adjusters assume that the clearance between the shoe and the drum increases solely due to lining wear and are therefore capable only of movement of the brake shoe towards the drum surface. Accordingly, if the drum expands due to changes in temperature, caused by, for example, repeated brake applications while the vehicle is decending a steep hill, prior art automatic slack adjusters automatically adjust the brake shoes up to the larger diameter. When the drum cools, the diameter of the drum decreases, so that the clearance between the brake shoes and the drum becomes too small. Oftentimes, the brakes drag, and over-adjustment occasionally results in locked brakes. To compensate for overadjustment due to hot drums, prior art automatic slack adjusters have a very slow adjustment rate, which makes over-adjustment less likely, but also causes excessive clearances between the shoes and the drum, particularly during conditions when the drum is hot, so that brake effectiveness, particularly with hot drums, is significantly decreased.

An automatic slack adjuster made pursuant to the teachings of the present invention avoids the difficulties of prior art automatic slack adjusters because it has the ability to both increase and decrease the clearance between the drum and the lining. Accordingly, the automatic slack adjuster made pursuant to the present invention can compensate not only for wear of the brake shoes, but can also compensate for changes in drum diameter due to changing drum temperatures. The automatic slack adjuster disclosed herein constantly monitors the clearance between the drum and the brake shoes, and adjusts for all changing clearance conditions, even if the clearance between the shoe and the drum is decreasing instead of increasing. As a result, the clearance between the brake shoes and the drum can be controlled much more closely than with prior art automatic slack adjusters, thereby providing for increased braking effectiveness, particularly during hot drum conditions.

Other features and advantages of the invention will appear in the following description with reference to the accompanying drawings in which FIG. 1 is a fragmentary plan view, partly in section, of a cam-actuated brake actuated by an automatic slack adjuster made pursuant to the present invention;

Figure 1:
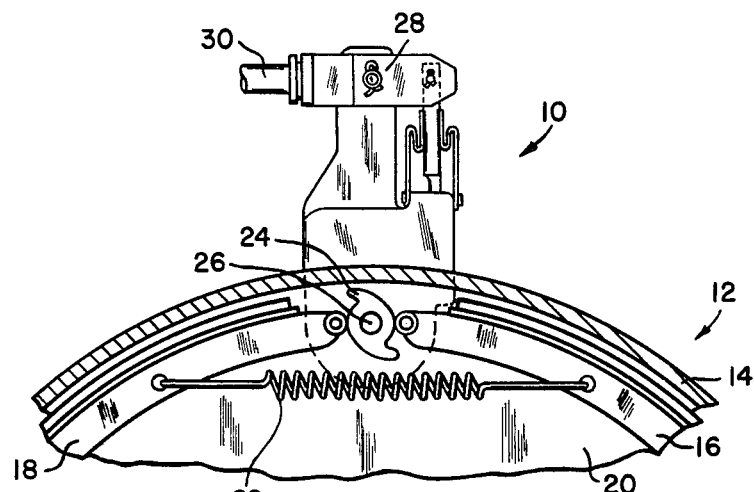

Referring now to FIG. 1, a brake actuator made pursuant to the teachings of the present invention is indicated by the numeral 10 in combination with an S-cam drum brake generally indicated by the numeral 12 with which the slack adjuster 10 is used. The S-cam drum brake includes a brake drum 14 which is mounted for rotation with a member to be braked (such as a vehicle wheel). A pair of brake shoes 16,18 are pivotally mounted on a stationary backing plate 20 which is mounted adjacent the drum 14 on a non-rotating portion of the vehicle. A shoe return spring 22 yieldably urges the brake shoes 16,18 away from the drum 14 and into engagement with a generally S-shaped cam actuator 24 which is mounted between contiguous ends of the brake shoes 16,18. The cam 24 is mounted for rotation with a drive shaft 26. The drive shaft 26 connects the cam 24 with the slack adjuster 10 for rotation tnereby. Rotation of the cam 24 is effected by stroking of the slack adjuster 10 by a fluid pressure actuator (not shown) which is connected to a yoke 28 on the end of the slack adjuster 10 through a push-rod 30. As the slack adjuster 10 is stroked, the drive shaft 26 is rotated, thereby rotating the cam 24 to urge the brake shoes 16,18 into engagement with the rotating drum 14. When the brake application is released, springs (not shown) within the aforementioned actuator urge the push-rod 30 to the left viewing FIG. 1, thereby returning the slack adjuster 10 and the cam 24 to the position illustrated in the drawing.

Figure 2:
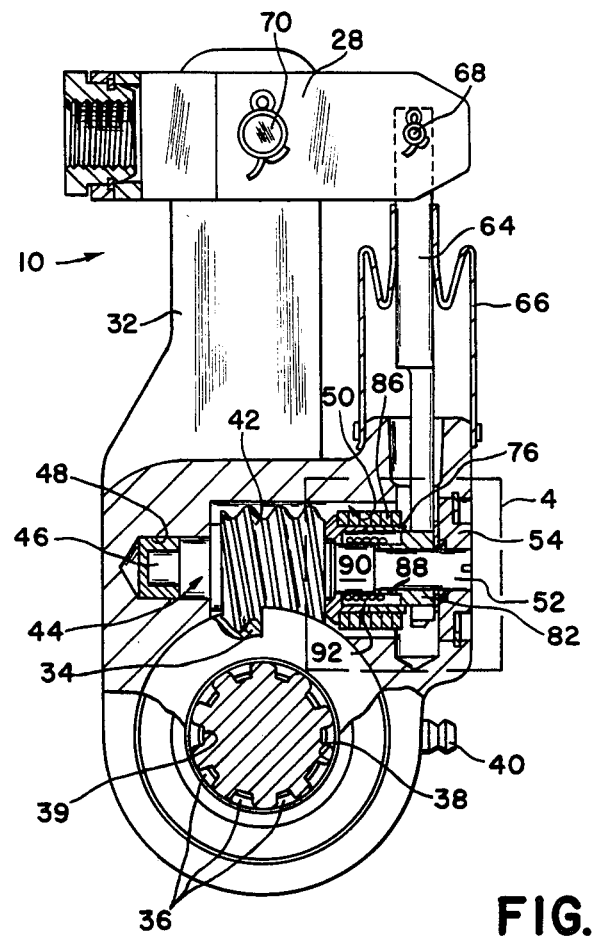
FIG. 2 is a side elevational view, partly in section, of the automatic slack adjuster illustrated in FIG. 1.
Figure 3:
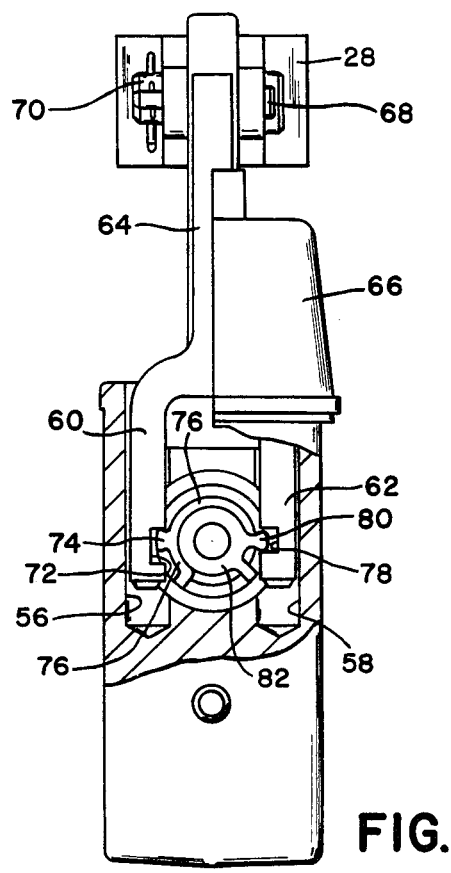
FIG. 3 is an end view, partly in section, of the automatic slack adjuster illustrated in FIG. 2.
Figure 4:
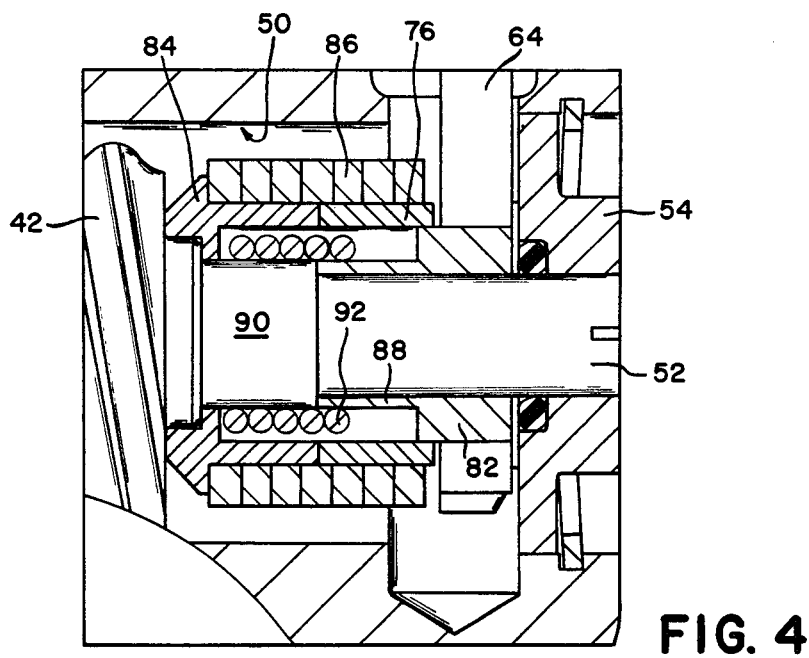
FIG. 4 is an enlarged view of the circumscribed portion of FIG. 2.

Referring now to FIGS. 2–4, the slack adjuster 10 includes a lever housing 32 which rotatably mounts a gear 34 which carries splines 36 projecting from the internal circumferential surface 38 of the gear 34. The splines 36 engage corresponding grooves 39 on the drive shaft 26 to connect the slack adjuster 10 to the drive shaft in a manner well known to those skilled in the art. A lubrication fitting 40 is provided so that the internal parts of the slack adjuster 10 may be lubricated.

A worm gear 42 meshes with the gear 34. Worm gear 42 is mounted on an adjustment shaft 44, one end 46 of which is rotatably mounted in smaller diameter portion 48 of a stepped bore 50 which is provided in the lever housing 32 to receive the worm gear 42. The opposite end 52 of the adjustment shaft 44 is rotatably mounted in a cover assembly 54, which closes the open end of the stepped bore 50. As is well known to those skilled in the art, rotation of the adjustment shaft 44 in a clockwise direction rotates the gear 34 in a counterclockwise direction, thereby effecting adjustment of the brakes by indexing the cam 24. Rotation of the adjustment shaft 44 in the opposite direction turns gear 34 in the clockwise direction, thereby backing off the brake adjustment and permitting the brake shoes 16,18 to move to a rest or brake released position which is further away from the drum 14.

The bore 50 is provided with cross bores 56,58 which are machined into the lever housing 32 and which intersect opposite edges of the stepped bore 50. The cross bores 56,58 receive legs 60,62 of a bifurcated link 64. A flexible boot 66 is mounted on the lever housing 32 to prevent contaminants from the environment from entering the cross bores 56,58. The end of the link 64 opposite the legs 60,62 is connected to the yoke 28 by a pivot pin 68. Another pivot pin 70 connects the yoke 28 to the lever housing 32.

An elongated slot 72 is provided in the leg 60. The slot 72 faces the adjustment shaft 44 and receives with clearance an adjustment lever 74 which projects radially from an adjustment sleeve 76 which circumscribes the adjustment shaft 44. Because the groove 72 is oversize, a lost motion connection is provided between the leg 60 and the adjustment lever 74, so that the adjustment lever 74 will not be moved by the leg 60 unless the link 64 is forced upwardly (viewing the drawings) a distance greater than the clearance between the bottom edge of the groove 72 (viewing FIG. 3) and the lever 74. Another groove 78 is provided in the leg 62 of the link 64, and receives a back-off lever 80 which projects radially from a back-off sleeve 82 which also circumscribes the adjustment shaft 44. It will, however, be noted that the back-off lever 80 is received within the groove 78 with little or no clearance, while a substantial clearance to provide the lost motion connection is provided between the groove 72 and the adjustment lever 74.

A clutch spring 86 provides a driving connection between the adjustment sleeve 76 and a worm driver 84 which is secured for rotation with the adjustment shaft 44. The back-off sleeve 82 includes a smaller diameter portion 88 which is drivingly engaged with portion 90 of the adjustment shaft 44 by a clutching device consisting of another clutch spring 92. The clutch springs 86 and 92 are similar, except that the clutch spring 86 is substantially stronger than the clutch spring 92, and the clutch springs 86 and 92 are wound in opposite directions. Accordingly, when a counterclockwise torque is applied to the clutch spring 92, the coils of the spring become smaller, so that the frictional grip between the clutch spring 92 and portion 88 of back-off sleeve 82 and portion 90 of the adjustment shaft 44 increases, thereby permitting the sleeve 82 to drive the adjustment shaft 44 in the counterclockwise direction. Of course, since only a frictional fit exists between the spring and the portions 88 and 90, the maximum torque that can be transmitted to the adjustment shaft 44 from the back-off sleeve 82 is limited to a predetermined torque which is just sufficient to overcome the frictional force exerted by the spring 92 as the latter is torqued. On the other hand, when the sleeve 82 is rotated in the clockwise direction, the coils of the spring 92 tend to grow or increase in size, thereby reducing the force of the frictional fit with the portions 88 and 90. Accordingly, the spring will slip at a torque much lower when rotated in the clockwise direction than the torque required to slip the spring 92 when rotated in the counterclockwise direction. In practice, the torque required to slip the clutch 92 when the sleeve 82 is rotated in the clockwise direction is less than the frictional torques exerted on the adjustment shaft 44 due to the friction between the worm 42 and the gear 34 and the torque exerted on the shaft 44 by friction retainer 100, so that upon rotation of the sleeve 82 in the clockwise direction, the sleeve 82 merely slips relative to the adjustment shaft 44.

The clutch spring 86 is wound clockwise, so that the coils of the spring 86 shrink or reduce in diameter slightly when a clockwise torque is applied to the spring 86. Accordingly, the adjustment sleeve 76 will be joined for rotation with the adjustment shaft driver 84 when the sleeve 76 is rotated in the clockwise direction, but the sleeve 76 will turn relative to the shaft 44 when the sleeve 76 is turned in a counterclockwise direction. Since the spring 86 is substantially stronger than the spring 92, the spring 86 overrides the clutch 92 when both the sleeves 82 and 76 are rotated simultaneously in directions in which their corresponding clutch springs 86,92 transmit torque.

In operation, movement of the yoke 28 to the right viewing the Figures by the aforementioned actuator (not shown) to stroke the automatic slack adjuster 10 to effect a brake application causes movement of the link 64 upwardly viewing the drawings. Because of the engagement of the back-off lever 80 and the slot 78 in the leg 62 of the link 64, upward movement of the link 64 rotates the back-off sleeve 82 in the counterclockwise direction. Since this is the direction in which the spring 92 transmits torque, the torque applied to the back-off sleeve 82 will be transmitted to the adjustment shaft 44, thereby turning the worm 42 and gear 34 in a direction backing off the brake adjustment to thereby increase the clearance between the drum 14 and the shoes 16,18. However, after the slack adjuster 10 has been stroked a predetermined distance sufficient to take up the lost motion between the adjustment lever 74 and the groove 72 in the leg 60, the lever 74 engages the bottom surface of the groove 72 so that torque is transmitted to the adjustment sleeve 76 through the link 64, the adjustment lever 74 and the sleeve 76. Since this is the direction in which the clutch spring 86 transmits torque, the sleeve 76 will be joined for rotation with the clutch driver 84. Accordingly, since both the sleeves 76,82 are joined for rotation of the adjustment shaft 44 by their corresponding clutch springs, the sleeves 82,76 attempt to rotate the adjustment shaft 44 in opposite directions. However, as pointed out hereinabove, the spring 86 is a stronger spring than is the spring 92, the spring 86 overrides the spring 92. Accordingly, once the lost motion provided by the elongated groove 72 is taken up, the adjustment shaft 44 is rotated in a direction to effect a brake application and the clutch spring 92 merely slips on the adjustment shaft 44. When the brake shoes 16,18 are driven into braking engagement with the drum 14, the forces transmitted through the gear 34 and worm 42 (and therefore to the adjustment shaft 44) increase substantially. Accordingly, the spring 86 is no longer able to transmit a driving torque to the driver 84 because of this increase in force. Accordingly, the spring 86 merely slips on the driver 84, so that movement of the slack adjuster after the brake shoes 16,18 are engaged with the drum is ignored.

If a brake application is effected and the brake shoes 16,18 are already at their proper clearance with respect to the drum 14, the groove 78 engages the back-off lever 80 to turn the back-off sleeve 82. The torque applied to the back-off sleeve 82 is transmitted to the adjustment shaft 44 by the clutch spring 92, to thereby back off the adjustment. However, after the lost motion provided by the groove 72 is taken up, the adjustment sleeve 76 is torqued to thereby drive the adjustment shaft 44 in the brake adjustment effecting direction. Since the brake shoes were already at the proper clearance when a brake adjustment is effected, the sleeve 76 will turn the adjustment shaft 44 in the brake adjusting direction through the same angle that the sleeve 82 turned the adjustment shaft 44 during the initial portion of the brake actuation. Turning of the shaft 44 is terminated when the shoes are brought into braking engagement with the drum so that the forces transmitted through the gear 34, worm gear 42 and adjustment shaft 44 cause the spring 86 to slip.

If the clearance between the brake shoes 16,18 and the drum 14 is greater than the desired clearance when a brake application is effected, the turning of the back-off sleeve 80 during the initial portion of the brake application will, nevertheless, turn the adjustment shaft 44 in the back-off direction. However, since the brake requires adjustment, the adjustment sleeve 76 will turn the adjustment shaft 44 back through an arc greater than the arc that the adjustment shaft was turned in the back-off direction by the sleeve 82 before the brake shoes 16,18 contact the drum 14 to terminate the adjustment by causing the spring 86 to slip. The arc through which the adjustment shaft 44 was turned by the adjustment sleeve 76 in excess of the arc in which the adjustment shaft 44 was turned in the opposite direction by the sleeve 82 represents the magnitude that the shoes are adjusted. The adjustment may be due either to wear of the brake shoes, or because a heated drum has increased the clearance between the shoes and drum.

If the clearance between the shoes 16,18 and the drum 14 is less than the desired clearance, because, for example, the brakes were adjusted as described in the preceding paragraph with a hot drum and the drum has now cooled, the back-off sleeve 82 will be turned in the counterclockwise direction. This movement will be transmitted to the adjustment shaft 44 by the spring 92 so that the adjustment shaft 44 is also turned in a direction backing off the brake shoes. Of course, as described hereinabove, after the actuator is stroked a predetermined distance sufficient to take up the lost motion between the lever 74 and the bottom of the groove 72, the adjustment shaft 76 will then be turned. This rotation of the adjustment sleeve 76 will be transmitted to effect a brake adjustment through the adjustment shaft 44. However, since the clearance between the shoes and the drum when the brake was released was less than the desired clearance, the arc through which the adjustment shaft 44 is turned by the sleeve 76 is less than the arc through which the adjustment shaft 44 was turned in the opposite direction by the sleeve 82. Since the arc through which the adjustment shaft 44 was turned in the back-off direction is greater, in this instance, than the arc through which the adjustment shaft 44 was turned in the brake adjusting effecting direction, this difference in arc represents the degree to which the brake shoes 16,18 are backed off from the drum 14, to thereby increase the clearance therebetween.

I claim:

1. Automatic slack adjuster for a vehicle brake actuated by a rotating drive shaft comprising a lever housing, means mounting said lever housing on said drive shaft to effect rotation of the latter in a brake application effecting direction upon stroking the lever housing, an adjustment shaft rotatably mounted in said lever housing and drivingly connected with the drive shaft to rotate the latter relative to the lever housing to effect brake adjustment by rotating the drive shaft relative to the housing in one direction when the adjustment shaft is rotated in a brake adjustment effecting direction and to back off said brake adjustment by rotating said drive shaft in the direction opposite to said one direction when the adjustment shaft is rotated in the direction opposite to said brake adjustment effecting direction, and means for effecting rotation of said adjustment shaft upon stroking of said lever housing, said rotation effecting means including back-off means for rotating said adjustment shaft in said opposite direction upon initial stroking of said housing and adjustment effecting means for rotating said adjustment shaft in the adjustment effecting direction after said initial stroking of said housing is effected.

2. Automatic slack adjuster for a vehicle brake actuated by a rotating drive shaft comprising a lever housing, means mounting said lever housing on said drive shaft to effect rotation of the latter in a brake application effecting direction upon stroking the lever housing, an adjustment shaft rotatably mounted in said lever housing and drivingly connected with the drive shaft to rotate the latter relative to the lever housing to effect brake adjustment by rotating the drive shaft relative to the housing in one direction when the adjustment shaft is rotated in a brake adjustment effecting direction and to back off said brake adjustment by rotating said drive shaft in the direction opposite to said one direction when the adjustment shaft is rotated in the direction opposite to said brake adjustment effecting direction, and means for effecting rotation of said adjustment shaft upon stroking of said lever housing, said rotation effecting means including back-off means for rotating said adjustment shaft in said opposite direction upon initial stroking of said housing and adjustment effecting means for rotating said adjustment shaft in the adjustment effecting direction, said rotation effecting means including a link pivotally connected to said lever housing, and means pivotally connecting the back-off means and the adjusting effecting means to said link.

3. Automatic slack adjuster as claimed in claim 2, wherein said pivotally connecting means includes a lost motion connection between the adjusting effecting means and the link.

4. Automatic slack adjuster as claimed in claim 3, wherein said link includes a bifurcated portion straddling said adjustment shaft to present a pair of legs on opposite sides of said shaft, said pivotally connecting means connecting each of said back-off means and said adjustment effecting means to a corresponding one of said legs.

5. Automatic slack adjuster as claimed in claim 4, wherein said back-off means includes a back-off lever drivingly engaged with one of said legs and said adjustment effecting means includes an adjustment lever drivingly engaged with the other leg, and means drivingly connecting each of said back-off and adjustment effecting levers to said adjustment shaft.

6. Automatic slack adjuster as claimed in claim 5, wherein both of said legs define slots receiving a corresponding one of said back-off and adjustment effecting lever, said slot engaging the adjustment effecting lever being larger than the portion of the adjustment effecting lever engaging the slot to thereby define said lost motion connection.

7. Automatic slack adjuster as claimed in claim 5, wherein the means drivingly connecting the adjustment effecting lever to the adjustment shaft includes a clutch mechanism breaking the connection between the adjustment shaft and the adjustment effecting lever when the forces transmitted therebetween exceed a predetermined amount.

8. Automatic slack adjuster as claimed in claim 7, wherein the means drivingly connecting the back-off lever to the adjustment shaft includes a clutching device which yields to break the driving connection between the back-off lever and the adjustment shaft after the lost motion provided by the lost motion connection is taken up and motion is transmitted by said adjustment effecting lever to turn the adjustment shaft in the adjustment effecting direction.

9. Automatic slack adjuster as claimed in claim 8, wherein both of said legs define slots receiving a corresponding one of said back-off and adjustment effecting lever, said slot engaging the adjustment effecting lever being larger than the portion of the adjustment effecting lever engaging the slot to thereby define said lost motion connection.

10. Automatic slack adjuster as claimed in claim 8, wherein each of said drivingly connecting means includes a pair of sleeves rotatably mounted on said adjustment shaft, each of said adjusting effecting lever and back-off lever extending from a corresponding one of said sleeves.

11. Automatic slack adjuster as claimed in claim 8, wherein said back-off means includes a back-off lever drivingly engaged with one of said legs and said adjustment effecting means includes an adjustment lever drivingly engaged with the other leg, and means drivingly connecting each of said back-off and adjustment effecting levers to said adjustment shaft.

12. Automatic slack adjuster as claimed in claim 11, wherein the means drivingly connecting the adjustment effecting lever to the adjustment shaft includes a clutch mechanism breaking the connection between the adjustment shaft and the adjustment effecting lever when the forces transmitted therebetween exceed a predetermined amount.

13. Automatic slack adjuster as claimed in claim 12, wherein the means drivingly connecting the back-off lever to the adjustment shaft includes a clutching device which yields to break the driving connection between the back-off lever and the adjustment shaft after the lost motion provided by the lost motion connection is taken up and motion is transmitted by said adjustment effecting lever to turn the adjustment shaft in the adjustment effecting direction.

14. Automatic slack adjuster as claimed in claim 3, wherein said link includes a bifurcated portion straddling said adjustment shaft to present a pair of legs on opposite sides of said shaft, said pivotally connecting means connecting each of said back-off means and said adjustment effecting means to a corresponding one of said legs.

15. Automatic slack adjuster for a vehicle brake actuated by a rotating drive shaft comprising a lever housing, means mounting said lever housing on said drive shaft to effect rotation of the latter in a brake application effecting direction upon stroking the lever housing, an adjustment shaft rotatably mounted in said lever housing and drivingly connected with the drive shaft to rotate the latter relative to the lever housing to effect brake adjustment by rotating the drive shaft relative to the housing in one direction when the adjustment shaft is rotated in a brake adjustment effecting direction and to back off said brake adjustment by rotating said drive shaft in the direction opposite to said one direction when the adjustment shaft is rotated in the direction opposite to said brake adjustment effecting direction, and means for effecting rotation of said adjustment shaft upon stroking of said lever housing, said rotation effecting means including back-off means for rotating said adjustment shaft in said opposite direction upon initial stroking of said housing and adjustment effecting means for rotating said adjustment shaft in the adjustment effecting direction, said back-off means including a back-off lever drivingly connected to said lever housing and said adjusting effecting means includes an adjustment lever drivingly connected to said lever housing, and means for drivingly connecting each of said back-off and adjusting effecting levers to the adjustment shaft.

16. Automatic slack adjuster as claimed in claim 15, wherein the driving connection between the adjustment effecting lever and the lever housing includes a lost motion mechanism to permit a predetermined movement of the lever before the adjustment effecting lever is operated.

17. Automatic slack adjuster as claimed in claim 16, wherein the means connecting the back-off lever and an adjusting effecting lever to the adjustment shaft includes a clutch mechanism breaking the driving connection between the adjustment shaft and the adjustment effecting lever when the forces transmitted therebetween exceed a predetermined level, and a clutching device which yields to break the driving connection between the back-off lever and the adjustment shaft after the lost motion provided by said lost motion mechanism is taken up and motion is transmitted by said adjustment effecting lever.

18. Automatic slack adjuster as claimed in claim 17, wherein both said clutching mechanism and said clutching device are coiled clutch springs, each of said coiled clutch springs being wound in a direction opposite to the direction that the other coiled clutch spring is wound.

* * * * *